(12) United States Patent  
Smith

(10) Patent No.: US 9,566,711 B2  
(45) Date of Patent: Feb. 14, 2017

(54) COORDINATED ROBOTIC CONTROL

(71) Applicant: Sarcos LC

(72) Inventor: Fraser M. Smith, Waltham, UT (US)

(73) Assignee: Sarcos LC, Salt Lake City, UT (US)

( * ) Notice: Subject to any disclaimer, the term of this patent is extended or adjusted under 35 U.S.C. 154(b) by 190 days.

(21) Appl. No.: 14/196,951

(22) Filed: Mar. 4, 2014

(65) Prior Publication Data

US 2015/0251316 A1 Sep. 10, 2015

(51) Int. Cl.
*G05B 19/418* (2006.01)
*B25J 9/16* (2006.01)

(52) U.S. Cl.
CPC ............ *B25J 9/1682* (2013.01); *B25J 9/1625* (2013.01); *B25J 9/1689* (2013.01); *B25J 9/1694* (2013.01); *G05B 19/41815* (2013.01); *G05B 2219/35444* (2013.01); *G05B 2219/39001* (2013.01); *G05B 2219/39146* (2013.01); *G05B 2219/40134* (2013.01); *G05B 2219/40136* (2013.01); *G05B 2219/40176* (2013.01); *G05B 2219/40234* (2013.01); *G05B 2219/40413* (2013.01); *G05B 2219/40414* (2013.01); *Y10S 901/27* (2013.01); *Y10S 901/28* (2013.01); *Y10S 901/46* (2013.01)

(58) Field of Classification Search
CPC ....... B62D 55/07; B62D 57/04; B62D 55/253; B62D 11/22; B62D 57/02; B62D 55/205; B25J 9/065; B25J 5/005; B25J 9/1682; B25J 9/1617; B25J 9/1697; B08B 9/045; G05B 19/41815; G05B 19/4182
USPC ....... 700/245, 246, 247, 248, 249, 250, 253, 700/257, 258, 264; 318/568.11, 568.12, 318/568.14, 568.16, 568.2
See application file for complete search history.

(56) References Cited

U.S. PATENT DOCUMENTS

| | | | |
|---|---|---|---|
| 1,107,874 | A | 8/1914 | Appleby |
| 1,112,460 | A | 10/1914 | Leavitt |
| 1,515,756 | A | 11/1924 | Roy |
| 1,975,726 | A | 10/1934 | Martinage |
| 2,025,999 | A | 12/1935 | Myers |
| 2,082,920 | A | 6/1937 | Aulmont |
| 2,129,557 | A | 9/1938 | Beach |
| 2,311,475 | A | 2/1943 | Schmeiser |
| 2,312,072 | A | 2/1943 | Broadwater |

(Continued)

FOREIGN PATENT DOCUMENTS

| | | |
|---|---|---|
| CA | 2512299 | 9/2004 |
| CN | 1603068 | 4/2005 |

(Continued)

OTHER PUBLICATIONS

Hutchison et al., Development of Control for a Serpentine Robot, 2007, Proceedings of the 7th IEEE International Symposium on Computational Intelligence in Robotics and Automation (CIRA2007), Jun. 20-23, 2007, Jacksonville, USA, pp. 1-6.*

(Continued)

*Primary Examiner* — Jaime Figueroa

(57) ABSTRACT

Device coordinated robotic control technology is described. A network of robotic devices is established. An anthropomorphic motion is sensed from an operator. One or more signals are generated that are representative of at least a portion of the anthropomorphic motion. The one or more signals are converted into a collective set of commands to actuate the network of robotic devices. The collective set of commands is functionally equivalent to the anthropomorphic motion.

18 Claims, 8 Drawing Sheets

(56) References Cited

U.S. PATENT DOCUMENTS

| | | |
|---|---|---|
| 2,329,582 A | 9/1943 | Bishop |
| 2,345,763 A | 4/1944 | Mayne |
| 2,701,169 A | 2/1955 | Cannon |
| 2,850,147 A | 9/1958 | Hill |
| 2,933,143 A | 4/1960 | Robinson |
| 2,967,737 A | 1/1961 | Moore |
| 3,037,571 A | 6/1962 | Zelle |
| 3,060,972 A | 10/1962 | Sheldon |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth |
| 3,223,462 A | 12/1965 | Dalrymple |
| 3,266,059 A | 8/1966 | Stelle |
| 3,284,964 A | 11/1966 | Saito |
| 3,311,424 A | 3/1967 | Taylor |
| 3,362,492 A | 1/1968 | Hansen |
| 3,387,896 A | 6/1968 | Sobota |
| 3,489,236 A | 1/1970 | Goodwin |
| 3,497,083 A | 2/1970 | Anderson |
| 3,565,198 A | 2/1971 | Ames |
| 3,572,325 A | 3/1971 | Bazell |
| 3,609,804 A | 10/1971 | Morrison |
| 3,650,343 A | 3/1972 | Helsell |
| 3,700,115 A | 10/1972 | Johnson |
| 3,707,218 A | 12/1972 | Payne |
| 3,712,481 A | 1/1973 | Harwood |
| 3,715,146 A | 2/1973 | Robertson |
| 3,757,635 A | 9/1973 | Hickerson |
| 3,808,078 A | 4/1974 | Snellman |
| 3,820,616 A | 6/1974 | Juergens |
| 3,841,424 A | 10/1974 | Purcell |
| 3,864,983 A | 2/1975 | Jacobsen |
| 3,933,214 A | 1/1976 | Guibord |
| 3,934,664 A | 1/1976 | Pohjola |
| 3,974,907 A | 8/1976 | Shaw |
| 4,015,553 A | 4/1977 | Middleton |
| 4,051,914 A | 10/1977 | Pohjola |
| 4,059,315 A | 11/1977 | Jolliffe |
| 4,068,905 A | 1/1978 | Black |
| 4,107,948 A | 8/1978 | Molaug |
| 4,109,971 A | 8/1978 | Black |
| 4,132,279 A | 1/1979 | Van der Lende |
| 4,218,101 A | 8/1980 | Thompson |
| 4,260,053 A | 4/1981 | Onodera |
| 4,332,317 A | 6/1982 | Bahre |
| 4,332,424 A | 6/1982 | Thompson |
| 4,339,031 A | 7/1982 | Densmore |
| 4,393,728 A | 7/1983 | Larson |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. |
| 4,661,039 A | 4/1987 | Brenhold |
| 4,671,774 A | 6/1987 | Owen |
| 4,700,693 A | 10/1987 | Lia |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A | 3/1988 | Rea |
| 4,736,826 A | 4/1988 | White et al. |
| 4,752,105 A | 6/1988 | Barnard |
| 4,756,662 A | 7/1988 | Tanie |
| 4,765,795 A | 8/1988 | Rebman |
| 4,784,042 A | 11/1988 | Paynter |
| 4,796,607 A | 1/1989 | Allred, III |
| 4,806,066 A | 2/1989 | Rhodes |
| 4,815,319 A | 3/1989 | Clement |
| 4,815,911 A | 3/1989 | Bengtsson |
| 4,818,175 A | 4/1989 | Kimura |
| 4,828,339 A | 5/1989 | Thomas |
| 4,828,453 A | 5/1989 | Martin et al. |
| 4,848,179 A | 7/1989 | Ubhayakar |
| 4,862,808 A | 9/1989 | Hedgecoxe |
| 4,878,451 A | 11/1989 | Siren |
| 4,900,218 A | 2/1990 | Sutherland |
| 4,909,341 A | 3/1990 | Rippingale |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,997,790 A | 3/1991 | Woo |
| 5,018,591 A | 5/1991 | Price |
| 5,021,798 A | 6/1991 | Ubhayakar |
| 5,022,812 A | 6/1991 | Coughlan |
| 5,046,914 A | 9/1991 | Holland et al. |
| 5,080,000 A | 1/1992 | Bubic |
| 5,130,631 A | 7/1992 | Gordon |
| 5,142,932 A | 9/1992 | Moya |
| 5,172,639 A | 12/1992 | Wiseman et al. |
| 5,174,168 A | 12/1992 | Takagi |
| 5,174,405 A | 12/1992 | Carra |
| 5,186,526 A | 2/1993 | Pennington |
| 5,199,771 A | 4/1993 | James |
| 5,205,612 A | 4/1993 | Sugden et al. |
| 5,214,858 A | 6/1993 | Pepper |
| 5,219,264 A | 6/1993 | McClure et al. |
| 5,252,870 A | 10/1993 | Jacobsen |
| 5,297,443 A | 3/1994 | Wentz |
| 5,317,952 A | 6/1994 | Immega |
| 5,337,732 A | 8/1994 | Grundfest |
| 5,337,846 A | 8/1994 | Ogaki et al. |
| 5,350,033 A | 9/1994 | Kraft |
| 5,354,124 A | 10/1994 | James |
| 5,363,935 A | 11/1994 | Schempf |
| 5,386,741 A | 2/1995 | Rennex |
| 5,413,454 A | 5/1995 | Movsesian |
| 5,426,336 A | 6/1995 | Jacobsen |
| 5,428,713 A | 6/1995 | Matsumaru |
| 5,435,405 A | 7/1995 | Schempf |
| 5,440,916 A | 8/1995 | Stone et al. |
| 5,443,354 A | 8/1995 | Stone et al. |
| 5,451,135 A | 9/1995 | Schempf |
| 5,465,525 A | 11/1995 | Mifune Hiroshi |
| 5,466,056 A | 11/1995 | James |
| 5,469,756 A | 11/1995 | Feiten |
| 5,516,249 A | 5/1996 | Brimhall |
| 5,519,814 A | 5/1996 | Rodriguez et al. |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen |
| 5,672,044 A | 9/1997 | Lemelson |
| 5,697,285 A | 12/1997 | Nappi |
| 5,712,961 A | 1/1998 | Matsuo |
| 5,749,828 A | 5/1998 | Solomon |
| 5,770,913 A | 6/1998 | Mizzi |
| 5,816,769 A | 10/1998 | Bauer |
| 5,821,666 A | 10/1998 | Matsumoto |
| 5,842,381 A | 12/1998 | Feiten |
| 5,845,540 A | 12/1998 | Rosheim |
| RE36,025 E | 1/1999 | Suzuki |
| 5,878,783 A | 3/1999 | Smart |
| 5,888,235 A | 3/1999 | Jacobsen |
| 5,902,254 A | 5/1999 | Magram |
| 5,906,591 A | 5/1999 | Dario |
| 5,984,032 A | 11/1999 | Gremillion |
| 5,996,346 A | 12/1999 | Maynard |
| 6,016,385 A * | 1/2000 | Yee et al. ............ 700/245 |
| 6,030,057 A | 2/2000 | Fikse |
| 6,056,237 A | 5/2000 | Woodland |
| 6,107,795 A | 8/2000 | Smart |
| 6,109,705 A | 8/2000 | Courtemanche |
| 6,113,343 A | 9/2000 | Goldenberg et al. |

(56) References Cited

U.S. PATENT DOCUMENTS

| | | |
|---|---|---|
| 6,132,133 A | 10/2000 | Muro et al. |
| 6,138,604 A | 10/2000 | Anderson |
| 6,162,171 A | 12/2000 | Ng |
| 6,186,604 B1 | 2/2001 | Fikse |
| 6,203,126 B1 | 3/2001 | Harguth |
| 6,232,735 B1 | 5/2001 | Baba et al. |
| 6,260,501 B1 | 7/2001 | Agnew |
| 6,263,989 B1 | 7/2001 | Won |
| 6,264,293 B1 | 7/2001 | Musselman |
| 6,264,294 B1 | 7/2001 | Musselman et al. |
| 6,272,396 B1 * | 8/2001 | Taitler ............... 700/245 |
| 6,281,489 B1 | 8/2001 | Tubel et al. |
| 6,323,615 B1 | 11/2001 | Khairallah |
| 6,325,749 B1 | 12/2001 | Inokuchi et al. |
| 6,333,631 B1 | 12/2001 | Das et al. |
| 6,339,993 B1 | 1/2002 | Comello |
| 6,380,889 B1 | 4/2002 | Herrmann et al. |
| 6,394,204 B1 | 5/2002 | Haringer |
| 6,405,798 B1 | 6/2002 | Barrett et al. |
| 6,408,224 B1 | 6/2002 | Okamoto |
| 6,411,055 B1 | 6/2002 | Fujita |
| 6,422,509 B1 | 7/2002 | Yim |
| 6,430,475 B2 | 8/2002 | Okamoto |
| 6,431,296 B1 | 8/2002 | Won |
| 6,446,718 B1 | 9/2002 | Barrett et al. |
| 6,450,104 B1 | 9/2002 | Grant |
| 6,477,444 B1 | 11/2002 | Bennett et al. |
| 6,484,083 B1 | 11/2002 | Hayward |
| 6,488,306 B1 | 12/2002 | Shirey et al. |
| 6,505,896 B1 | 1/2003 | Boivin |
| 6,512,345 B2 | 1/2003 | Borenstein |
| 6,522,950 B1 | 2/2003 | Conca et al. |
| 6,523,629 B1 | 2/2003 | Buttz |
| 6,529,806 B1 | 3/2003 | Licht |
| 6,535,793 B2 | 3/2003 | Allard |
| 6,540,310 B1 | 4/2003 | Cartwright |
| 6,557,954 B1 | 5/2003 | Hattori |
| 6,563,084 B1 | 5/2003 | Bandy |
| 6,574,958 B1 | 6/2003 | Macgregor |
| 6,576,406 B1 | 6/2003 | Jacobsen et al. |
| 6,595,812 B1 | 7/2003 | Haney |
| 6,610,007 B2 | 8/2003 | Belson |
| 6,619,146 B2 | 9/2003 | Kerrebrock |
| 6,636,781 B1 | 10/2003 | Shen et al. |
| 6,651,804 B2 | 11/2003 | Thomas |
| 6,652,164 B2 | 11/2003 | Stiepel et al. |
| 6,668,951 B2 | 12/2003 | Won |
| 6,708,068 B1 | 3/2004 | Sakaue |
| 6,715,575 B2 | 4/2004 | Karpik |
| 6,725,128 B2 | 4/2004 | Hogg et al. |
| 6,772,673 B2 | 8/2004 | Seto |
| 6,773,327 B1 | 8/2004 | Felice |
| 6,774,597 B1 | 8/2004 | Borenstein |
| 6,799,815 B2 | 10/2004 | Krishnan |
| 6,820,653 B1 | 11/2004 | Schempf |
| 6,831,436 B2 | 12/2004 | Gonzalez |
| 6,835,173 B2 | 12/2004 | Couvillon, Jr. |
| 6,837,318 B1 | 1/2005 | Craig |
| 6,840,588 B2 | 1/2005 | Deland |
| 6,866,671 B2 | 3/2005 | Tierney |
| 6,870,343 B2 | 3/2005 | Borenstein |
| 6,889,118 B2 | 5/2005 | Murray et al. |
| 6,917,176 B2 | 7/2005 | Schempf |
| 6,923,693 B2 | 8/2005 | Borgen |
| 6,936,003 B2 | 8/2005 | Iddan |
| 6,959,231 B2 | 10/2005 | Maeda |
| 6,971,141 B1 | 12/2005 | Tak |
| 7,017,687 B1 | 3/2006 | Jacobsen et al. |
| 7,020,701 B1 | 3/2006 | Gelvin et al. |
| 7,040,426 B1 | 5/2006 | Berg |
| 7,044,245 B2 | 5/2006 | Anhalt et al. |
| 7,069,124 B1 | 6/2006 | Whittaker et al. |
| 7,090,637 B2 | 8/2006 | Dankitz |
| 7,137,465 B1 | 11/2006 | Kerrebrock |
| 7,144,057 B1 | 12/2006 | Young et al. |
| 7,171,279 B2 | 1/2007 | Buckingham et al. |
| 7,188,473 B1 | 3/2007 | Asada |
| 7,188,568 B2 | 3/2007 | Stout |
| 7,228,203 B2 | 6/2007 | Koselka et al. |
| 7,235,046 B2 | 6/2007 | Anhalt et al. |
| 7,331,436 B1 | 2/2008 | Pack et al. |
| 7,387,179 B2 | 6/2008 | Anhalt et al. |
| 7,415,321 B2 | 8/2008 | Okazaki et al. |
| 7,475,745 B1 | 1/2009 | DeRoos |
| 7,539,557 B2 | 5/2009 | Yamauchi |
| 7,546,912 B1 | 6/2009 | Pack et al. |
| 7,597,162 B2 | 10/2009 | Won |
| 7,597,762 B2 | 10/2009 | Albanese et al. |
| 7,600,592 B2 | 10/2009 | Goldenberg et al. |
| 7,645,110 B2 | 1/2010 | Ogawa et al. |
| 7,654,348 B2 | 2/2010 | Ohm et al. |
| 7,762,362 B2 | 7/2010 | Cutkosky et al. |
| 7,775,312 B2 | 8/2010 | Maggio |
| 7,798,264 B2 | 9/2010 | Hutcheson et al. |
| 7,843,431 B2 | 11/2010 | Robbins et al. |
| 7,845,440 B2 | 12/2010 | Jacobsen |
| 7,860,614 B1 | 12/2010 | Reger |
| 7,865,266 B2 * | 1/2011 | Moll et al. ............... 700/245 |
| 7,874,386 B2 | 1/2011 | Ben-Tzvi et al. |
| 7,974,736 B2 | 7/2011 | Morin et al. |
| 8,002,365 B2 | 8/2011 | Jacobsen |
| 8,002,716 B2 | 8/2011 | Jacobsen |
| 8,042,630 B2 | 10/2011 | Jacobsen |
| 8,162,410 B2 | 4/2012 | Hirose et al. |
| 8,185,241 B2 | 5/2012 | Jacobsen |
| 8,205,695 B2 | 6/2012 | Jacobsen et al. |
| 8,225,892 B2 | 7/2012 | Ben-Tzvi |
| 8,317,555 B2 | 11/2012 | Jacobsen et al. |
| 8,392,036 B2 | 3/2013 | Jacobsen |
| 8,393,422 B1 | 3/2013 | Pensel |
| 8,571,711 B2 | 10/2013 | Jacobsen et al. |
| 9,031,698 B2 | 5/2015 | Smith |
| 2007/0289786 A1 | 12/2007 | Cutkowsky et al. |
| 2008/0115687 A1 | 5/2008 | Gal et al. |
| 2008/0164079 A1 | 7/2008 | Jacobsen |
| 2008/0167662 A1* | 7/2008 | Kurtz ............... 606/130 |
| 2008/0167752 A1 | 7/2008 | Jacobsen |
| 2008/0168070 A1 | 7/2008 | Naphade |
| 2008/0192569 A1 | 8/2008 | Ray et al. |
| 2008/0215185 A1 | 9/2008 | Jacobsen |
| 2008/0217993 A1 | 9/2008 | Jacobsen |
| 2008/0272647 A9 | 11/2008 | Hirose et al. |
| 2008/0281231 A1 | 11/2008 | Jacobsen |
| 2008/0281468 A1 | 11/2008 | Jacobsen |
| 2008/0284244 A1 | 11/2008 | Hirose et al. |
| 2009/0025988 A1 | 1/2009 | Jacobsen et al. |
| 2009/0030562 A1 | 1/2009 | Jacobsen |
| 2009/0035097 A1 | 2/2009 | Loane |
| 2009/0095209 A1 | 4/2009 | Jamieson |
| 2009/0132088 A1* | 5/2009 | Taitler ............... 700/264 |
| 2009/0171151 A1 | 7/2009 | Choset et al. |
| 2009/0212157 A1 | 8/2009 | Arlton et al. |
| 2009/0248202 A1 | 10/2009 | Osuka et al. |
| 2010/0030377 A1 | 2/2010 | Unsworth |
| 2010/0036544 A1 | 2/2010 | Mashiach |
| 2010/0174422 A1 | 7/2010 | Jacobsen |
| 2010/0201185 A1 | 8/2010 | Jacobsen |
| 2010/0201187 A1 | 8/2010 | Jacobsen |
| 2010/0228548 A1* | 9/2010 | Liu et al. ............... 704/251 |
| 2010/0258365 A1 | 10/2010 | Jacobsen |
| 2010/0268470 A1 | 10/2010 | Kamal et al. |
| 2010/0317244 A1 | 12/2010 | Jacobsen |
| 2010/0318242 A1 | 12/2010 | Jacobsen et al. |
| 2012/0072019 A1* | 3/2012 | Sanders et al. ............... 700/245 |
| 2012/0185095 A1 | 7/2012 | Rosenstein et al. |
| 2012/0205168 A1 | 8/2012 | Flynn et al. |
| 2012/0264414 A1 | 10/2012 | Fung |
| 2012/0277914 A1 | 11/2012 | Crow et al. |
| 2012/0292120 A1 | 11/2012 | Ben-Tzvi |
| 2013/0054021 A1* | 2/2013 | Murai et al. ............... 700/245 |
| 2014/0121835 A1 | 5/2014 | Smith |
| 2015/0081092 A1 | 3/2015 | Jacobsen |

(56) References Cited

U.S. PATENT DOCUMENTS

| | | | |
|---|---|---|---|
| 2015/0127150 A1* | 5/2015 | Ponulak et al. | 700/250 |
| 2015/0127155 A1* | 5/2015 | Passot et al. | 700/257 |

FOREIGN PATENT DOCUMENTS

| | | |
|---|---|---|
| CN | 2774717 | 4/2006 |
| CN | 1970373 | 5/2007 |
| CN | 101583820 | 5/2011 |
| DE | 3025840 | 2/1982 |
| DE | 3626238 | 2/1988 |
| DE | 3626328 | 2/1988 |
| DE | 19617852 | 10/1997 |
| DE | 19714464 | 10/1997 |
| DE | 19704080 | 8/1998 |
| DE | 10018075 | 1/2001 |
| DE | 102004010089 | 9/2005 |
| EP | 0105418 | 4/1984 |
| EP | 0584520 | 3/1994 |
| EP | 0818283 | 1/1998 |
| EP | 0924034 | 6/1999 |
| EP | 1444043 | 8/2004 |
| EP | 1510896 | 3/2005 |
| EP | 1832501 | 9/2007 |
| EP | 1832502 | 9/2007 |
| EP | 2081814 | 7/2009 |
| EP | 2082159 | 7/2009 |
| EP | 2170683 | 4/2010 |
| EP | 2444006 A2 | 4/2012 |
| EP | 2549165 A1 | 1/2013 |
| EP | 2092265 | 4/2013 |
| FR | 2638813 | 5/1990 |
| FR | 2660730 | 10/1991 |
| FR | 2609335 A1 | 7/1998 |
| FR | 2850350 | 7/2004 |
| GB | 1199729 | 7/1970 |
| JP | S50-108110 A | 8/1975 |
| JP | S51-106391 A | 9/1976 |
| JP | 52 57625 | 5/1977 |
| JP | S52-122431 | 9/1977 |
| JP | S58-032870 | 2/1983 |
| JP | 58-89480 | 5/1983 |
| JP | S58-80387 U | 5/1983 |
| JP | S59-139494 U | 9/1984 |
| JP | 60015275 | 1/1985 |
| JP | 560-047771 A | 3/1985 |
| JP | 60060516 | 4/1985 |
| JP | 60139576 | 7/1985 |
| JP | SHO 60-211315 | 10/1985 |
| JP | S61-001581 | 1/1986 |
| JP | SHO 61-180885 | 1/1986 |
| JP | S61-020484 U | 2/1986 |
| JP | SHO61-054378 | 3/1986 |
| JP | SHO61-075069 | 4/1986 |
| JP | 61089182 | 5/1986 |
| JP | S61-260988 | 11/1986 |
| JP | SHO 62-36885 | 3/1987 |
| JP | 62165207 | 7/1987 |
| JP | 62-162626 | 10/1987 |
| JP | S61-51353 | 10/1987 |
| JP | S63-32084 | 3/1988 |
| JP | S63-501208 A | 5/1988 |
| JP | S63-170174 A | 7/1988 |
| JP | 63306988 | 12/1988 |
| JP | H02-109691 A | 4/1990 |
| JP | H03-007388 | 1/1991 |
| JP | H03-104572 | 5/1991 |
| JP | 04092784 | 3/1992 |
| JP | 4126656 A | 4/1992 |
| JP | H05-003087 | 1/1993 |
| JP | H05-069350 | 3/1993 |
| JP | 05147560 | 6/1993 |
| JP | HEI05-270454 | 10/1993 |
| JP | H05-286460 A | 11/1993 |
| JP | 06-115465 | 4/1994 |
| JP | 2007-216936 | 8/1995 |
| JP | 7329841 | 12/1995 |
| JP | H07-329837 | 12/1995 |
| JP | H08-133141 | 5/1996 |
| JP | H08-133151 A | 5/1996 |
| JP | H09-109069 | 4/1997 |
| JP | H09-109070 | 4/1997 |
| JP | H09-142347 | 6/1997 |
| JP | H10-277976 | 10/1998 |
| JP | H11-277466 A | 10/1999 |
| JP | H11-347970 | 12/1999 |
| JP | 2001-010560 | 1/2001 |
| JP | 2001-195113 | 7/2001 |
| JP | 2003-019985 | 1/2003 |
| JP | 2003-237618 A | 8/2003 |
| JP | 2003/315486 A | 11/2003 |
| JP | 2003-334783 | 11/2003 |
| JP | 2004/080147 A | 3/2004 |
| JP | 03535508 | 6/2004 |
| JP | 2004-536634 | 12/2004 |
| JP | 2005-19331 | 1/2005 |
| JP | 2005-081447 | 3/2005 |
| JP | 2005-111595 A | 4/2005 |
| JP | 2005111595 | 4/2005 |
| JP | 2005-169561 | 6/2005 |
| JP | 2006-510496 | 3/2006 |
| JP | 2006-107024 | 4/2006 |
| JP | 2006-173782 | 6/2006 |
| JP | 2007-237991 | 9/2007 |
| JP | 2010-509129 | 3/2010 |
| JP | 2012-187698 | 10/2012 |
| JP | 2013-010165 | 1/2013 |
| JP | 2013-091114 | 5/2013 |
| WO | WO 87/02635 | 5/1987 |
| WO | WO 96/37727 | 11/1996 |
| WO | WO97/26039 | 7/1997 |
| WO | WO00/10073 | 2/2000 |
| WO | WO 00/10073 | 2/2000 |
| WO | WO02/16995 | 2/2002 |
| WO | WO 02/095517 | 11/2002 |
| WO | WO03/030727 | 4/2003 |
| WO | WO03037515 | 5/2003 |
| WO | WO 2004/056537 | 7/2004 |
| WO | WO2005/018428 | 3/2005 |
| WO | WO 2006/068080 | 6/2006 |
| WO | WO 2008/049050 | 4/2008 |
| WO | WO 2008/073203 | 6/2008 |
| WO | WO 2008/076194 | 6/2008 |
| WO | WO 2008/127310 A2 | 10/2008 |
| WO | WO 2008/135978 | 11/2008 |
| WO | WO 2009/009673 | 1/2009 |
| WO | WO 2010/070666 | 6/2010 |
| WO | WO 2012/061932 | 5/2012 |

OTHER PUBLICATIONS

Office Action for U.S. Appl. No. 14/026,284 dated Aug. 11, 2015, 29 pages.

Arnold, Henry, "Cricket the robot documentation." online manual available at http://www.parallaxinc.com, 22 pages.

Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.

Ijspeert et al; From Swimming to Walking with a Salamander Robot Driven by a Spinal Cord Model; Science; Mar. 2007; pp. 1416-1419; vol. 315; American Association for the Advancement of Science.

Hirose, et al., "Snakes and strings; new robotic components for rescue operations," International Journal of Robotics Research, Apr.-May 2004, pp. 341-349, vol. 23, No. 4-5.

Paap et al., "A robot snake to inspect broken buildings," IEEE, 2000, pp. 2079-2082, Japan.

Braure, Jerome, "Participation to the construction of a salamander robot: exploration of the morphological configuration and the locomotion controller", Biologically Inspired Robotics Group, master thesis, Feb. 17, 2004, pp. 1-46.

(56) References Cited

OTHER PUBLICATIONS

Jacobsen, et al., Advanced intelligent mechanical sensors (AIMS), Proc. IEEE Trandsucers Jun. 24-27, 1991, abstract only, San Fransico, CA.

Jacobsen, et al., "Research robots for applications in artificial intelligence, teleoperation and entertainment", International Journal of Robotics Research, 2004, pp. 319-330, vol. 23.

Jacobsen, et al., "Multiregime MEMS sensor networks for smart structures," Procs. SPIE 6th Annual Inter. Conf. on Smart Structues and Materials, Mar. 1-5, 1999, pp. 19-32, vol. 3673, Newport Beach CA.

Maclean et al., "A digital MEMS-based strain gage for structural health monitoring," Procs. 1997 MRS Fall Meeting Symposium, Nov. 30-Dec. 4, 1997, pp. 309-320, Boston Massachusetts.

Berlin et al., "MEMS-based control of structural dynamic instability", Journal of Intelligent Material Systems and Structures, Jul. 1998 pp. 574-586, vol. 9.

Goldfarb, "Design and energetic characterization of a liquid-propellant-powered actuator for self-powered robots," IEEE Transactions on Mechatronics, Jun. 2003, vol. 8 No. 2.

Dowling, "Limbless Locomotion: Learning to crawl with a snake robot," The Robotics Institute at Carnegie Mellon University, Dec. 1997, pp. 1-150.

Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proceedings/SESSION%2026/m116-Heverly.pdf.

NASA: "Nasa's newest concept vehicles take off-roading out of this world" Internet article, Nov. 5, 2008, http://www.nasa.gov/mission_pages/constellation/main/lunar_truck.html.

Revue Internationale De defense, "3-D vision and urchin" Oct. 1, 1988, p. 1292, vol. 21, No. 10, Geneve CH.

Advertisement, International Defense review, Jane's information group, Nov. 1, 1990, p. 54, vol. 23, No. 11, Great Britain.

Ren Luo "Development of a multibehavior-based mobile robot for remote supervisory control through the internet" IEEE/ ASME Transactions on mechatronics, IEEE Service Center, Piscataway, NY, Dec. 1, 2000, vol. 5, No. 4.

Nilas Sueset et al., "A PDA-based high-level human-robot interaction" Robotics, Automation and Mechatronics, IEEE Conference Singapore, Dec 1-3, 2004, vol. 2, pp. 1158-1163.

Mehling et al; A Minimally Invasive Tendril Robot for In-Space Inspection; Feb. 2006; The First IEEE/RAS-EMBS International Conference on Biomedical Robotics and Biomechatronics (BioRob '06) p. 690-695.

Mahabatra et al; "Design and Implementation of Coordinated Multipurpose Robotic System with RF and Light Communication Channels"; Paper entirely based on study, research and experiments.

Simmons et al; "Coordinated Deployment of Multiple, Heterogeneous Robots"; School of Computer Science, Carnegie Mellon University, Pittsburgh PA.; Honeywell Technology Center, Minneapolis, MN; Intelligent Robot Systems, 2000; vol. 3 pp. 2254-2260.

Blackburn, et al.; Improved mobility in a multi-degree-of-freedom unmanned ground vehicle; *Unmanned Ground Vehicles Technology VI*; Sep. 2, 2004; 124-134; Proceedings of SPIE vol. 5422.

Schenker, et al.; Reconfigurable robots for all terrain exploration; Jet Propulsion Laboratory, California Institute of Technology; 2000; 15 pages.

Celaya et al.; Control of a Six-Legged Robot Walking on Abrupt Terrain; Proceedings of the 1996 IEE International Conference on Robotics and Automation, Minneapolis, Minnesota; Apr. 1996; 6 pages.

Van Der Burg et al.; Anti-Lock Braking and Traction Control Concept for All-Terrain Robotic Vehicles; Proceedings of the 1997 IIEE International Conference on Robotics and Automation; Albuquerque, New Mexico; Apr. 1997; 6 pages.

Hutchison et al.; Development of Control for a Serpentine Robot; Proceedings of the 7th IEEE International Symposium on Computational Intelligence in Robotics and Automation (CIRA2007); Jun. 2007; 6 pages; Jacksonville, FL.

PCT Application PCT/US10/38331; filed Jun. 11, 2009; Stephen C. Jacobsen; international search report issued Dec. 1, 2010.

PCT Application PCT/US2010/038339; filed Jun. 11, 2010; Stephen C. Jacobsen; international search report mailed Feb. 9, 2011.

PCT Application PCT/US2013/042739; filed May 24, 2013; Raytheon Company; international search report dated Aug. 21, 2013.

PCT Application PCT/US2013/067840; filed Oct. 31, 2013; Raytheon Company; international search report mailed Aug. 29, 2014.

PCT Application PCT/US2014//055673; filed Sep. 15, 2014; Raytheon Company; international search report mailed Jun. 25, 2015.

EP Application 08826145.8; filed Jul. 10, 2008; Raytheon Company; European Search Report dated Apr. 5, 2013.

U.S. Appl. No. 12/171,144, filed Jul. 10, 2008; Stephen C. Jacobsen; office action issued Aug. 11, 2010.

U.S. Appl. No. 12/694,996, filed Jan. 27, 2010; Stephen C. Jacobsen; office action issued Sep. 30, 2010.

U.S. Appl. No. 11/985,324, filed Nov. 13, 2007; Stephen C. Jacobsen; office action issued Nov. 1, 2010.

U.S. Appl. No. 12/151,730, filed May 7, 2008; Stephen C. Jacobsen; office action issued Nov. 15, 2010.

U.S. Appl. No. 12/820,881, filed Jun. 22, 2010; Stephen C. Jacobsen; office action issued Nov. 30, 2010.

U.S. Appl. No. 12/765,618, filed Apr. 22, 2010; Stephen C. Jacobsen; office action issued Apr. 6, 2011.

U.S. Appl. No. 11/985,320, filed Nov. 13, 2007; Stephen C. Jacobsen; office action issued Apr. 12, 2011.

U.S. Appl. No. 11/985,336, filed Nov. 13, 2007; Stephen C. Jacobsen; office action issued Jun. 14, 2011.

U.S. Appl. No. 12/350,693, filed Jan. 8, 2009; Stephen C. Jacobsen; office action issued Oct. 12, 2011.

U.S. Appl. No. 11/985,320, filed Nov. 13, 2007; Stephen C. Jacobsen; office action issued Nov. 25, 2011.

U.S. Appl. No. 12/814,302, filed Jun. 11, 2010; Stephen C. Jacobsen; office action issued Jan. 10, 2012.

U.S. Appl. No. 12/171,146, filed Jul. 10, 2008; Stephen C. Jacobsen; office action issued Feb. 9, 2012.

U.S. Appl. No. 12/350,693, filed Jan. 8, 2009; Stephen C. Jacobsen; office action issued Mar. 28, 2012.

U.S. Appl. No. 13/181,380, filed Jul. 12, 2011; Stephen C. Jacobsen; office action dated Jul. 17, 2012.

U.S. Appl. No. 12/171,146, filed Jul. 10, 2008; Stephen C. Jacobsen; office action dated Aug. 20, 2012.

U.S. Appl. No. 12/814,304, filed Jun. 11, 2010; Stephen C. Jacobsen; office action dated Nov. 13, 2012.

U.S. Appl. No. 12/117, 233, filed May 8, 2008; Stephen C. Jacobsen; office action dated Nov. 23, 2012.

U.S. Appl. No. 12/117,233, filed May 8, 2008; Stephen C. Jacobsen; office action dated Aug. 15, 2013.

U.S. Appl. No. 12/814,304, filed Jun. 11, 2010; Stephen C. Jacobsen; office action dated Oct. 24, 2013.

U.S. Appl. No. 12/814,304, filed Jun. 11, 2010; Stephen C. Jacobsen; office action dated May 22, 2014.

U.S. Appl. No. 13/665,669, filed Oct. 31, 2012; Fraser M. Smith; office action dated Jul. 7, 2014.

U.S. Appl. No. 14/026,284, filed Sep. 13, 2013; Stephen C. Jacobsen; office action issued Apr. 3, 2015.

U.S. Appl. No. 14/196,951, filed Mar. 4, 2014; Fraser M. Smith; office action dated Jun. 1, 2015.

U.S. Appl. No. 12/151,730, filed May 7, 2008; Stephen C. Jacobsen; notice of allowance issued Apr. 15, 2011.

U.S. Appl. No. 11/985,324, filed Nov. 13, 2007; Stephen C. Jacobsen; notice of allowance issued Apr. 18, 2011.

U.S. Appl. No. 12/820,881, filed Jun. 22, 2010; Stephen C. Jacobsen; notice of allowance issued Jun. 9, 2011.

U.S. Appl. No. 11/985,336, filed Nov. 13, 2007; Stephen C. Jacobsen; notice of allowance issued Jan. 19, 2012.

U.S. Appl. No. 12/765,618, filed Apr. 22, 2010; Stephen C. Jacobsen; notice of allowance issued Feb. 2, 2012.

U.S. Appl. No. 12/814,302, filed Jun. 11, 2010; Stephen C. Jacobsen; notice allowance dated Jul. 25, 2012.

(56) References Cited

OTHER PUBLICATIONS

U.S. Appl. No. 12/350,693, filed Jan. 8, 2009; Stephen C. Jacobsen; notice allowance dated Sep. 20, 2012.
U.S. Appl. No. 13/481,631, filed May 25, 2012; Ralph W. Pensel; notice of allowance dated Sep. 24, 2012.
U.S. Appl. No. 13/181,380, filed Jul. 12, 2011; Stephen C. Jacobsen; notice of allowance dated Dec. 24, 2012.
U.S. Appl. No. 12/171,146, filed Jul. 10, 2008; Stephen C. Jacobsen; notice of allowance dated Jun. 24, 2013.
U.S. Appl. No. 12/814,304, filed Jun. 11, 2010; Stephen C. Jacobsen; notice of allowance mailed Sep. 10, 2014.
U.S. Appl. No. 13/665,669, filed Oct. 31, 2012; Fraser Smith.
U.S. Appl. No. 14/026,284, filed Sep. 13, 2013; Stephen C. Jacobsen.
U.S. Appl. No. 14/196,951, filed Mar. 4, 2014; Fraser Smith.
Akin et al, "MORPHbots: Lightweight Modular Self Reconfigurable Robotics for Space Assembly, Inspection, and Servicing", Space, Sep. 2006, 11 pages, University of Maryland.

* cited by examiner

COORDINATED ROBOTIC CONTROL

BACKGROUND

Robots are electro-mechanical machines that are controlled by one or more computer programs and/or electronic circuitry. Autonomous robots are robots that can perform desired tasks in unstructured environments without continuous human guidance. Semi-autonomous robots and non-autonomous robots, in contrast, often require human guidance.

Robots are used in a variety of fields, including for example, manufacturing, space exploration, and medicine. Specialized robots are generally designed to perform a single task or a single set of tasks like painting a body of a car.

Humanoid robots are a category of robots that attempt to emulate some human tasks including dirty or dangerous jobs. A humanoid robot is a robot with its body shape built to resemble that of the human body. A humanoid might be designed for functional purposes, such as interacting with human tools and environments. In general, humanoid robots have a torso, a head, two arms, and two legs. Some humanoid robots may also have heads designed to replicate human sensory features such as eyes or ears.

DETAILED DESCRIPTION

A coordinated robotic control technology is described. In particular, the technology may allow coordinated use of two or more robots as a network of robotic devices. The network of robotic devices may be able to remotely accomplish various coordinated human-like, or complex or multifaceted tasks, or even simple coordinated tasks (hereinafter "coordinated tasks"). A human operator may provide control by manipulating a set of sensors. A single robotic device in the network of robotic devices may accomplish a portion of a human-like task in a bounded environment while the remaining robotic devices in the network of robotic devices may accomplish the remaining portions of the human-like task in the bounded environment. In such an arrangement, a remotely located operator could wear a mastering device that carried out real-time measurement of his/her joint positions, displayed by a single or stereo presentation of the views to a head-mounted display, for example, and communicate the desired motions to the collection of robotic devices within the network of robotic devices, which could carry out the motions as though they were anatomically consistent with the operator. In short, the operator would not necessarily be concerned that his interface with the objects in the environment was via a number of robotic devices, none of which is a humanoid robot, just that they are collectively able to function as though they were, within the context of the environment in which they are located. The coordinated use of multiple robots can be made to act like a single unit. This can occur without the necessity of the robotic devices being physically connected.

As one example, driving a vehicle may be a human-like task involving several different types of anthropomorphic motions to accomplish one human-like task. These human-like tasks might include, for example, turning a steering wheel, flipping on a turn signal, engaging a clutch, moving a shifter, increasing acceleration with an accelerator, and applying a brake.

As a more particular example, an operator may indicate flipping on the turn signal by moving a left hand in a downward motion on an edge of a remote steering wheel prop while keeping a right hand fixed on the remote steering wheel prop. A set of sensors may be advantageously placed on or around the operator to detect such motion. This motion may then be carried out by the network of robotic devices. One robotic device in the network of robotic devices might hold the steering wheel steady while another robotic device may flip the turn signal on, for example.

Figure 1:
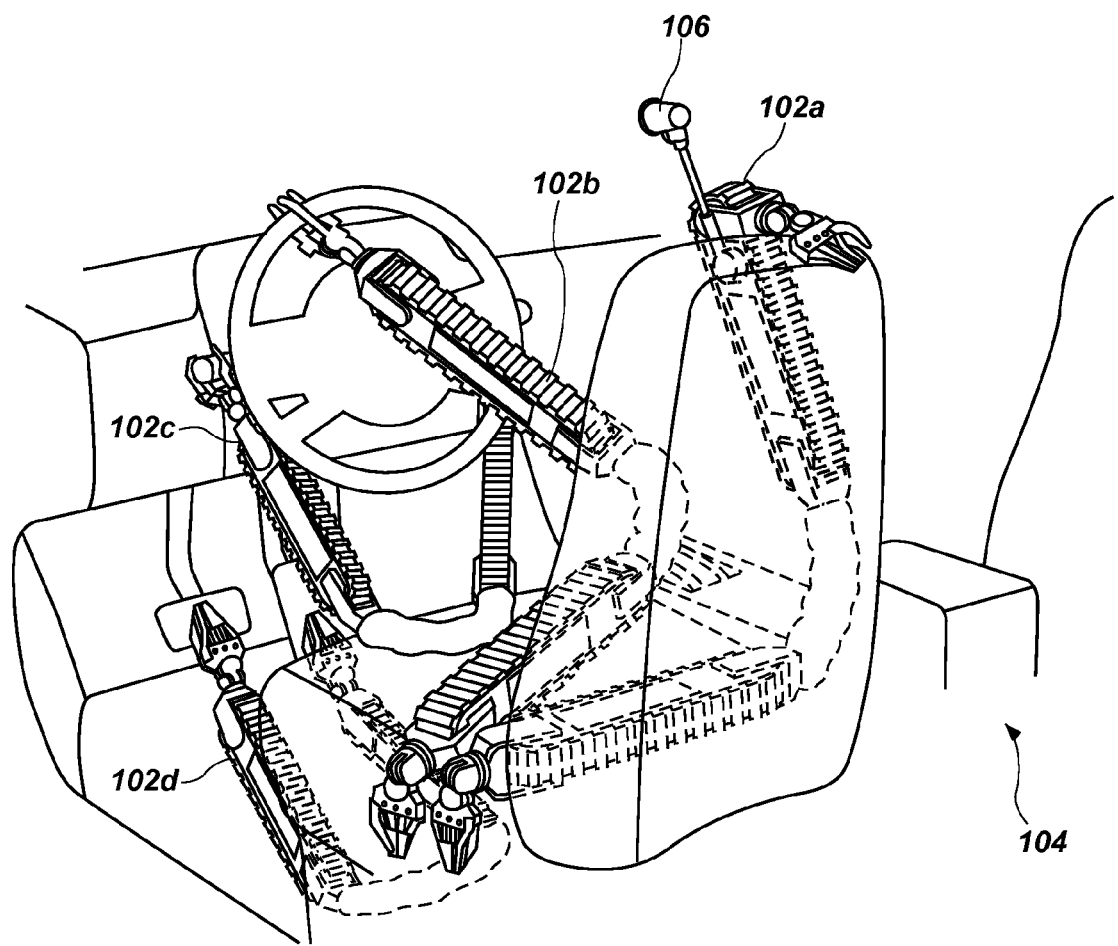
FIG. 1 illustrates a network of robotic devices, in accordance with one exemplary embodiment.
Figure 2:
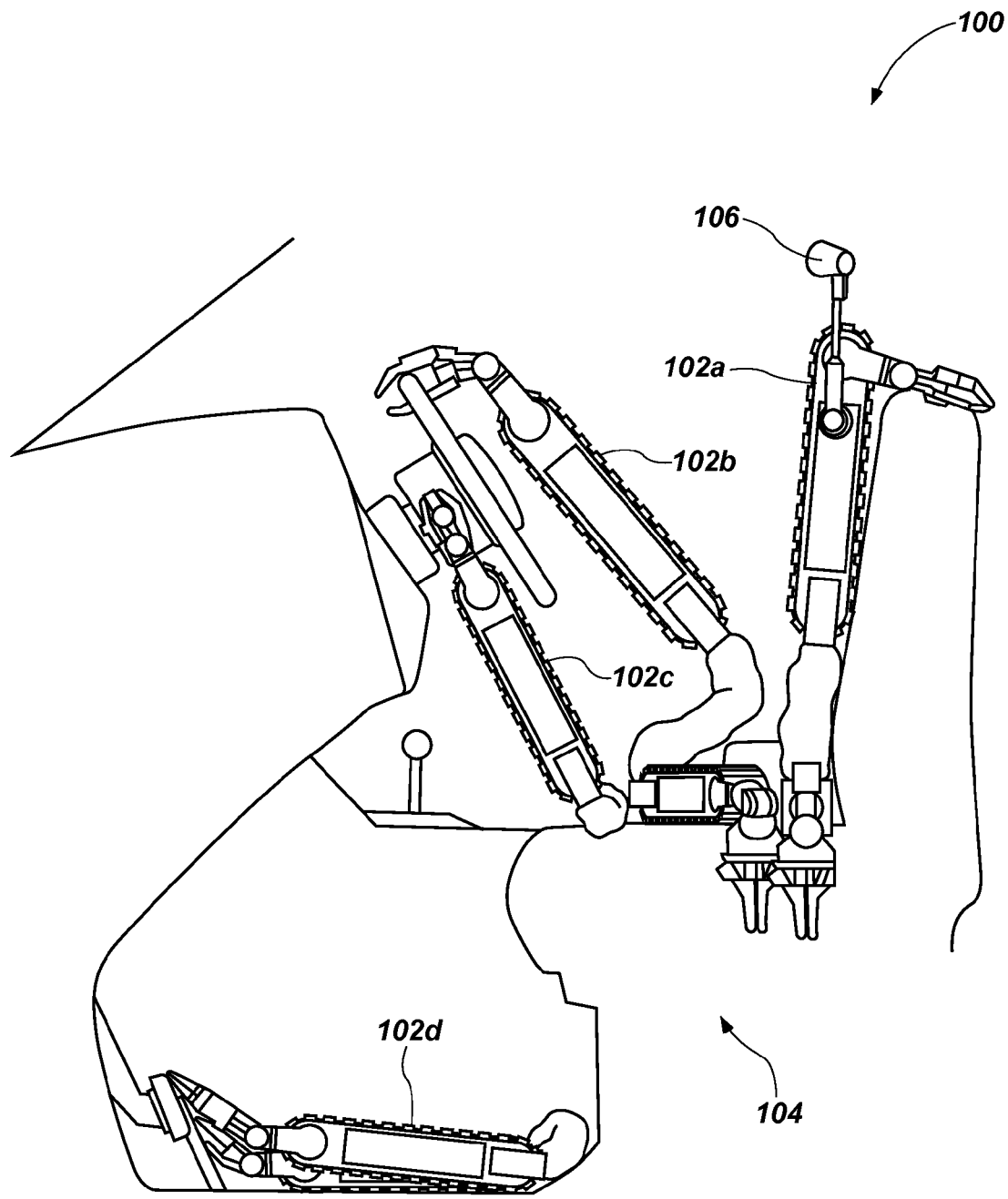
FIG. 2 illustrates another view of the example network of robotic devices of FIG. 1.

Accordingly, with reference to FIG. 1 and FIG. 2, an example network of robotic devices 100 is illustrated. In particular, the network of robotic devices 100 includes four robotic devices 102a-d. A camera 106 also acts as a feedback device providing visual information to an operator of the network of robotic devices 100.

The network of robotic devices 100, are operating in an environment 104. More particularly, the environment 104 is a driver's area in a vehicle. The robotic devices 102a-d may receive a command and actuate a motion based on the command. In this way, the network of robotic devices 100 may act in a coordinated fashion to perform human-like tasks. The operator may be remotely located and provide anthropomorphic motion through a set of sensors to control the network of robotic devices 100. More robotic devices may be added to the network of robotic devices 100 in order to perform more complex tasks, or tasks requiring a greater range of motion.

As an example, to drive a vehicle as illustrated, a human may need to be able to see, turn a steering wheel, engage a turn signal, move a shifter, press an accelerator or press a brake. Rather than implementing a single human form factor robotic device, four robotic devices 102a-d may act in a coordinated fashion to provide functionally equivalent motion to that of the operator.

More particularly, the robotic device 102a may be positioned on a seat to be able to position the camera 106 to see through a windshield and latterly out side windows and rear view mirrors of the vehicle. The robotic device 102b may also be positioned on the seat and may turn the steering wheel of the vehicle. The robotic device 102c may be positioned on the seat and may engage the turn signal and/or move the shifter. The robotic device 102d may be positioned on the floor and may press the accelerator or the brake. In this way, the network of robotic devices 100 may act in a coordinated way to perform human-like tasks.

Figure 3:
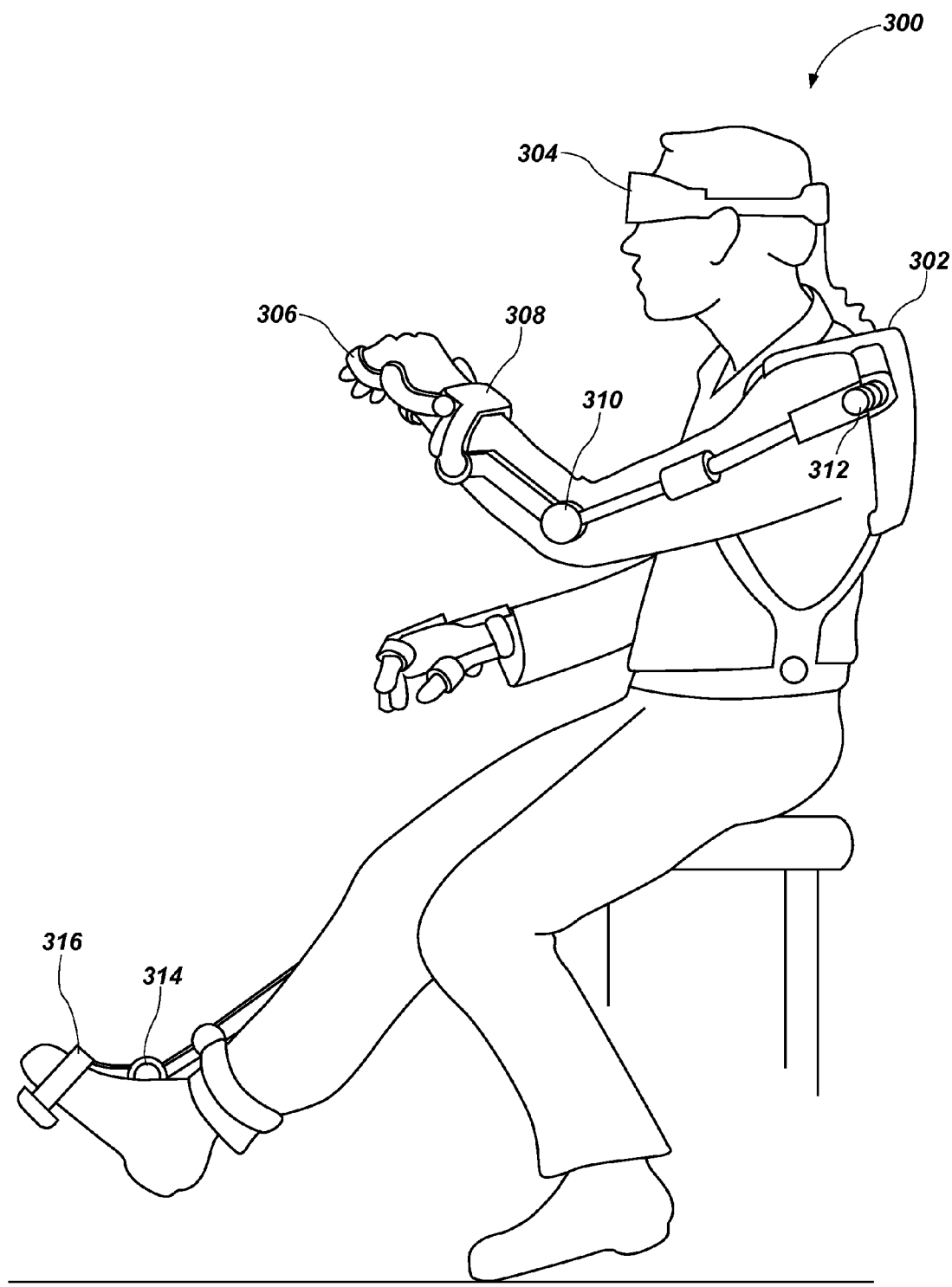
FIG. 3 illustrates an example portion of a coordinated robotic control system being used by an operator.

FIG. 3 illustrates an example portion of a coordinated robotic control system being used by an operator 300. In particular, the coordinated robotic control system includes a plurality of control sensors 306, 308, 310, 312, 314, 316 to sense anthropomorphic motion from the operator 300. When the operator 300 moves, the control sensors 306, 308, 310, 312, 314, 316 sense the motion and generate an output signal representative of the motion. The control sensors 306, 308, 310, 312, 314, 316 for example, may be accelerometers or digital positioning devices that provide three-dimensional coordinates for the sensors. As another example, the sensors 306, 308, 310, 312, 314, 316 may measure angular rotation or pressure or force of the operator's 300 joints. The plurality of control sensors may be attached to an operator, or may sense motion from some distance from the operator. For example, a radar or LIDAR, or other 3D depth-sensing device may be placed a few feet from an operator and pointed towards the operator to sense a portion of the anthropomorphic motion. Various combinations of sensors may be used to sense the anthropomorphic motion of the operator 200.

The coordinated robotic control system may also include a coordinated robotic control device. The coordinated robotic control device is communicatively connected to the plurality of control sensors 306, 308, 310, 312, 314, 316 and may convert the anthropomorphic motion sensed by the plurality of control sensors 306, 308, 310, 312, 314, 316 into a collective set of commands. The collective set of commands may actuate a plurality of robotic devices, such as those described in FIGS. 1 and 2. In this way, the collective set of commands may actuate one or more serpentine robotic crawlers, such as those shown and described in U.S. patent application Ser. No. 14/026,284 filed on Sep. 13, 2013 and Ser. No. 13/665,669 filed on Oct. 31, 2012, each of which are incorporated by reference in their entirety herein.

The motion within the network of robotic devices actuated by the collective set of commands can be functionally equivalent to the anthropomorphic motion sensed by the plurality of control sensors. For example, the motion may be the operator 200 pulling back a foot, moving the foot towards the left and pushing the foot forward, to simulate movement of a foot from an accelerator pedal to a brake pedal (i.e., this may comprise a desired lower level task that may be considered or termed a sub-task to the higher level coordinated task of driving a car to be completed by the network of robotic devices). While, as depicted in FIGS. 1 and 2, the functionally equivalent motion performed by the robotic device 102d may not include a single robotic foot moving from an accelerator pedal to a brake pedal, one end of the robotic device 102d may disengage the accelerator pedal while the other end of the robotic device 102d may engage the brake pedal. In this way, the objects in the environment of the robotic device 102d, namely the accelerator pedal and the brake pedal, are acted upon in a functionally equivalent manner. Thus, the plurality of robotic devices may receive commands and actuate one or more motions based on the commands, such that the collective set of commands results in movement or motions by the robotic devices that are functionally equivalent or substantially functionally equivalent to the anthropomorphic motions of the operator (i.e., those motions within the network needed to accomplish the coordinated task). As will be described in more detail later, the functionally equivalent motions within the network of robotic devices can be carried out by one or a plurality of robotic devices, the motions being coordinated (e.g., motions by two or more robots used to carry out a task initiated by the operator).

The coordinated robotic control device may be housed in a backpack 302, as illustrated in FIG. 3, or may be housed in another location and communicatively connected to the plurality of control sensors 306, 308, 310, 312, 314, 316. Similarly, the coordinated robotic control system may also include one or more feedback devices, such as a video device 304. In this way, feedback may be sensed from the network of robotic devices.

The robotic control device may use one or more computer systems configured with executable instructions to convert the anthropomorphic motion to the collective set of commands. In this way, the backpack 302 may house a programmable computer with software instructions configured to perform the conversion. The backpack 302 may also house circuitry implementing similar processing to perform the conversion.

Once the anthropomorphic motion, as sensed by the plurality of control sensors 306, 308, 310, 312, 314, 316, has been converted into a collective set of commands, the collective set of commands may be communicated to the network of robotic devices. Distribution of the collective set of commands may be performed in a variety of ways. For example, a respective subset of commands may be communicated to each robotic device in the network of robotic devices. In this way, each robotic device in the network of robotic devices may directly receive a subset of commands. Alternatively, the network of robotic device may include a master robotic device and one or more slave robotic devices. The master robotic device may receive the collective set of commands and then may distribute the collective set of commands to the network of robotic devices as appropriate. In this way, each robotic device in the network of robotic devices may receive a subset of commands either directly (e.g. the master robotic device) or indirectly by way of the master robotic device (e.g. the slave robotic devices).

Figure 4:
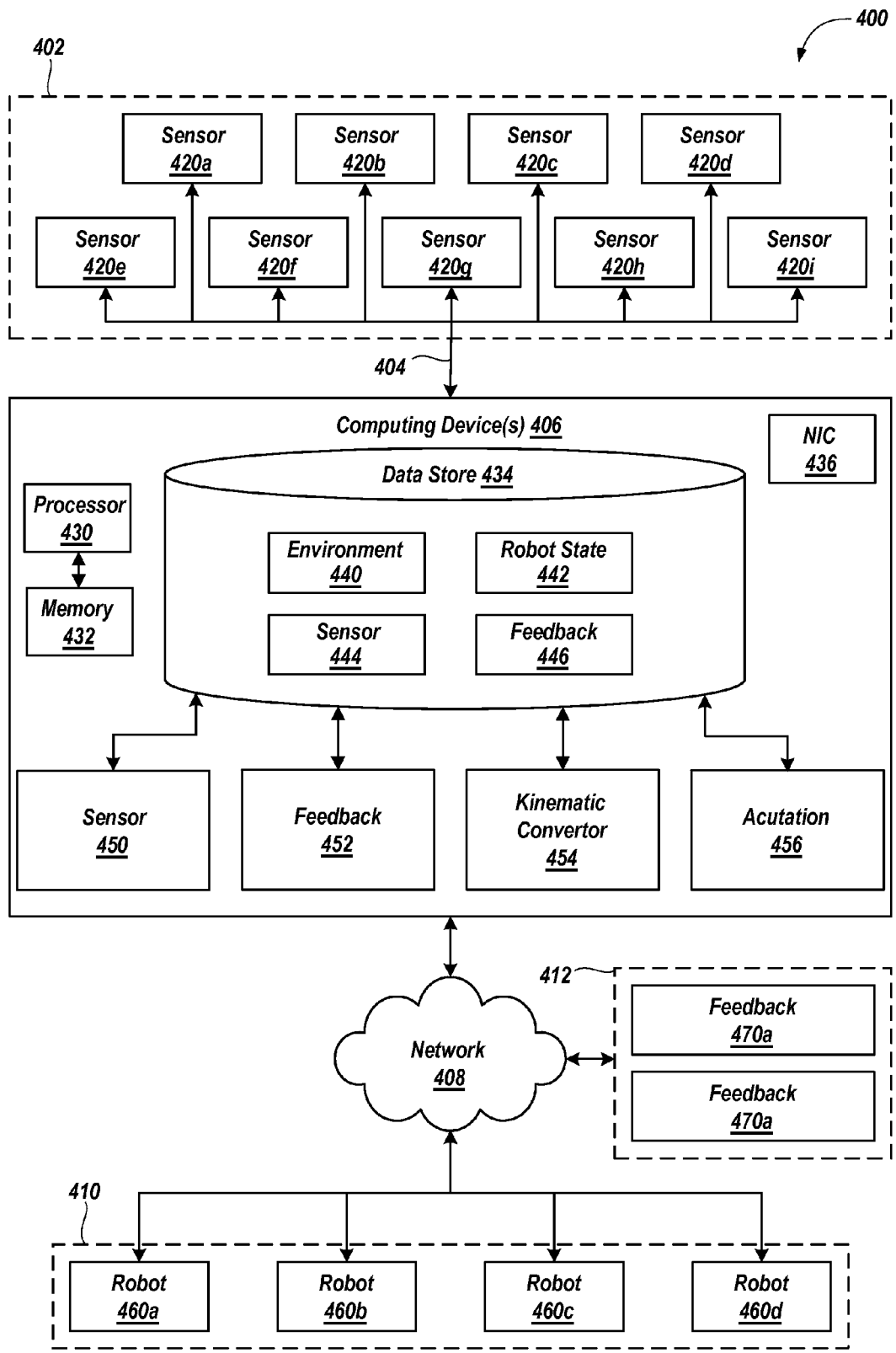
FIG. 4 is a component block diagram illustrating an example coordinated robotic system.

FIG. 4 is a component block diagram illustrating an example coordinated robotic system. The system 400 may be used to implement the functionality heretofore described with reference to FIGS. 1-3 or further examples discussed below with reference to FIGS. 5-8. The system 400 may include one or more computing devices 406, a network of robotic devices 410, a set of feedback devices 412 and a set of sensors 402. A network 408 may communicatively connect the set of feedback devices 412 and the network of robotic devices 410 with the computing device 406.

The network 408 may include any useful computing or signal network, including an intranet, the Internet, a local area network (LAN), a wide area network (WAN), a wireless data network, a cell network, a direct RF link, a stateless relay network or any other such network or combination thereof, and may utilize a variety of protocols for transmission thereon, including for example, Internet Protocol (IP), the transmission control protocol (TCP), user datagram protocol (UDP) and other networking protocols. Components utilized for such a system may depend at least in part upon the type of network and/or environment selected. Communication over the network may be enabled by wired, fiber optic, or wireless connections and combinations thereof.

Each of the robotic devices 460a-d in network of robotic devices 410, along with each feedback device 470a-b in the set of feedback devices 412 and each of the sensors 420a-i in the set of sensors 402 may each have certain data processing and storage capabilities. A robotic device, for instance, may have a processor, a memory and a data store, for example. Likewise a feedback device or a sensor may also have a processor, a memory and a data store. Further all devices may have network interfaces circuitry (NIC) for interfacing with the network 408. The computing device 434, for instance, depicts a NIC 436 for the computing device 434.

While the network of robotic devices 410 and the set of feedback devices 412 are depicted as being connected through the network 408 to the computing device 406, it is appreciated that the network of robotic devices 410 and the set of feedback devices 412 may be connected through separate networks to the computing device 406. Further, while the set of sensors 402 is shown as directly connecting to the computing device 406 through a local interface 404, it is appreciated that the set of sensors 402 may connect through a network such as the network 408 to communicate with the computing device 496.

The computing device 406 may comprise, for example, a server computer or any other system providing computing capability. Alternatively, a plurality of computing devices 406 may be employed that are arranged, for example, in one or more server banks or computer banks or other arrangements. For purposes of convenience, the computing device 406 may be referred to in the singular, but it is understood that a plurality of computing devices 406 may be employed in various arrangements as described above.

Various processes and/or other functionality, as discussed herein, may be executed in the system 400 according to various examples. The computing device 406, may for example, provide some central server processing services while other devices in the coordinated robotic system 400 may provide local processing services and interface processing services to interface with the services of the computing device 406. Therefore, it is envisioned that processing services, as discussed herein, may be centrally hosted functionality or a service application that may receive requests and provide output to other services or customer devices.

For example, services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. A processor 430 may provide processing instructions by communicating with a memory 432 on the computing device 406. That is, the memory device may include instructions operable to be executed by the processor to perform a set of actions. The processor 430 and/or the memory 432 may directly or indirectly communicate with a data store 434. Each robotic device in the network of robotic devices 410, each sensor in the set of sensors 402 and each feedback device in the set of feedback devices 412, may include similar processing capabilities. Alternatively, some or all of the processing capabilities may be provided by the computing device 406 or other devices in the coordinated robotic system such as a master robotic device.

Various data may be stored in a data store 434 that is accessible to the computing device 406. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 434 may include storage systems such as a SAN (Storage Area Network), cloud storage network, volatile or non-volatile RAM, optical media, or hard-drive type media. The data store 434 may be representative of a plurality of data stores 434.

The data stored in the data store 434 may include, for example, an environment data store 440, a robot state data store 442, a sensor data store 444 and a feedback data store 446. The environment data store 440 may include details about the environment in which the robotic devices 460*a-d* are configured to operate effectively. In this way the environment data store may contain some information regarding the functional limitation of the system 400 and include information regarding conversion of the sensed anthropomorphic motion into a collective set of commands to actuate degrees of motion by the network of robotic devices 410. Thus an environment may be programmatically defined for a kinematic convertor module 454 which limits functional equivalency. For example, the environment may be programmatically defined with an extensible markup language (XML) document and stored in the data store 440. Another standard that may be used is the joint architecture for unmanned systems (JAUS). The robot state data store 442 may include details about the state of the robotic devices 460*a-d* such as positioning information, loading information, velocity information, acceleration information, location information, signal strength information, stability information, and environmental surrounds. The sensor data store 444 may act as a buffer or processing area for data provided by the sensors 420*a-i*. Likewise, the feedback data store 446 may also act as a buffer or processing area for data provided by feedback devices 470*a-b*.

A sensor module 450 may provide an interface for receiving and processing data from the set of sensors 402. In this way, the sensor module 450 may interact with the sensor data store 444 and other modules such as a kinematic converter module 454. Thus a control sensor may be configured to sense anthropomorphic motion and communicate the anthropomorphic motion to the computing device 406. A Feedback module 452 may be an interface for the set of feedback devices 412 and may interact with the feedback data store 446. In this way, a feedback device may be configured to receive robotic feedback. Sensed feedback may then be presented to an operator through actuating an operator device, generating audio, engaging vibratory pads, or through a visual display. Moreover, received feedback may be presented to an operator through a device integrated with at least one of a plurality of control sensors, for instance.

The kinematic convertor module 454 may convert the anthropomorphic motion, sensed by the sensors 420*a-i*, into a collective set of commands to actuate degrees of motion by one or more robotic devices 460*a-d* within the network of robotic devices 410. The collective set of commands can be functionally equivalent or substantially equivalent to the anthropomorphic motion, meaning that a function carried out by the user is equivalently carried out within the network of robotic devices 410 by one or a plurality of robotic devices. In this way, the kinematic convertor module 454 may interact with the sensor data store 444, the environment data store 440 and the robot state data store 442. Moreover, the kinematic convertor module 454 may also interact with other modules such as an actuation module 456 to communicate the collective set of commands to the network of robotic devices 410 for actuation thereby. In this way, the actuation module 456 may provide an interface for sending commands to the network of robotic devices 410 for actuation. Thus, the kinematic convertor module 454 may be configured to convert an anthropomorphic motion, sensed by the plurality of control sensors, into a collective set of commands to actuate degrees of motion by the network of robotic devices, wherein the collective set of commands are functionally equivalent to the anthropomorphic motion, and a communication interface may be configured to communicate with the network of robotic devices 410. Any of the feedback devices 420*a-i* may include devices such as a video display, an audio speaker, or a tactile feedback device. Further, the plurality of control sensors may sense three-dimensional motion.

In one embodiment, the kinematic converter module 454 may be configured beforehand to anticipate scenarios in which the robots 460*a-d* may be used in. For example, the kinematic converter module 454 may include pre-programmed primitives designed for a specific high level task, such as driving a car, placing physiologic sensors on an unconscious human, or operating a control panel that is in a hazardous environment. In this way, an operator may be assured that the robotic devices within the network 460*a-d* collectively comprise sufficient degrees of freedom in order to carry out specific tasks within the environment. Nonetheless, the collection of robots can be configured and reconfigured to carry out new or different tasks within the same or different environments. For example, the collection of robots may be configured in a travel mode and individually operated to move from one location to another, wherein upon reaching a desired destination the collection of robotic devices may then be reconfigured and located in a position capable of carrying out or accomplishing the desired task. For illustrative purposes only, a plurality of serpentine (snake-like) robots may be individually configured in a travel or drive mode to gain access to a desired environment via a dimensionally restricted route (e.g., down a borehole or mineshaft), and then reconfigured and positioned within the desired environment to provide coordinated dexterous tasks within the environment, such as being positioned within a vehicle, wherein the task to be accomplished is the driving of the vehicle. Once in position, the operator can carry out the dexterous tasks within the environment via tele-operation using, for example, a mastering device that is kinematically consistent with the operator, wherein output from the mastering device is transformed to provide commands to the robotic devices within the network to accomplish what otherwise could have been accomplished had the commands been sent to a kinematically equivalent slave robot.

In one exemplary embodiment illustrating coordinated control of the various robotic devices, the sensors 420*a-i* may include defined zones or bounded areas of control space. Corresponding operator movement within these zones of control space may indicate control of one or more robots 460 based upon the operator movement. Once the operator leaves a zone of control space, a sensor 420 may no longer interpret operator movement as controlling one or more robots 460. However, another zone of control for another sensor 420 may interpret operator movement as controlling one or more other robots 460 from within that zone of control (i.e., other degrees of freedom used to accomplish the task). In other words, a single motion by an operator across multiple defined zones may cause multiple degrees of freedom to activate within the network of robotic devices, which multiple degrees of freedom may be across or located about multiple robotic devices. Such zones of operation can be based on or determined by factors such as the environment itself, the ranges of motion of the various robotic devices within the network of robotic devices, the ranges of motion of the individual degrees of freedom of the various robotic devices, the particular location and number of robotic devices, and others. The zones of operation can be represented numerically (such as in terms of their Cartesian coordinates relative to a reference point), graphically (e.g., mapped environment), or by any other system or method or means apparent to those skilled in the art used to define a range of motion of a degree of freedom of a robotic device.

Figure 5:
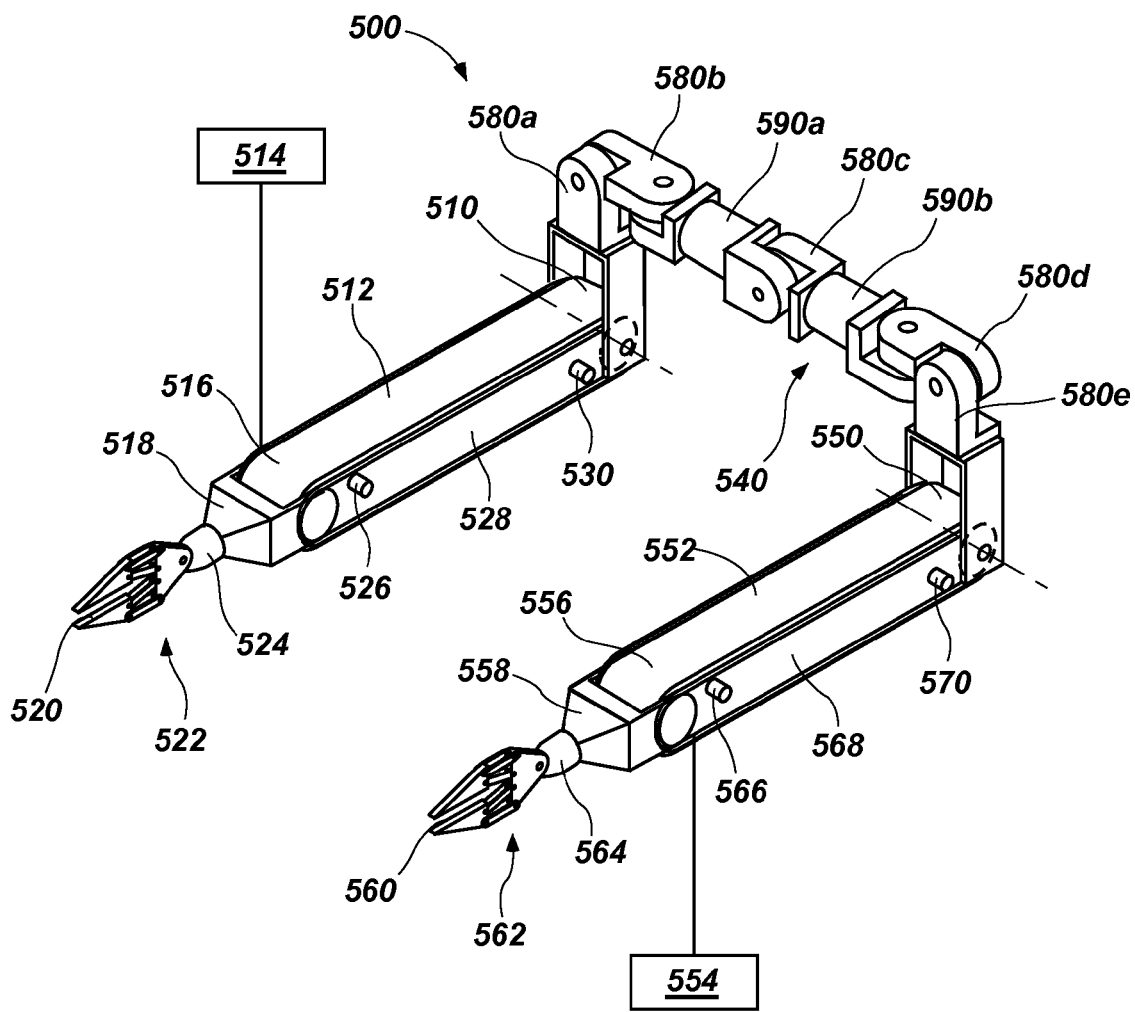
FIG. 5 illustrates an example serpentine robotic crawler.

FIG. 5 illustrates an example serpentine robotic crawler 500, which is similar to the robotic crawler described in U.S. patent application Ser. No. 14/026,284, filed Sep. 13, 2013, and entitled, "Serpentine Robotic Crawler for Performing Dexterous Operations," (Attorney Docket No. 2865-12.3329.US.NP), which is incorporated by reference in its entirety herein. The serpentine robotic crawler 500 may be used as a robotic device in the network of robotic devices and may include a plurality of dexterous manipulators that can be positioned and articulated to perform dexterous operations in a variety of situations, some of which will be discussed in detail below. As shown, a first dexterous manipulator 562 can be coupled about a distal end 556 of a first frame 568, and a second dexterous manipulator 522 can be coupled about a distal end 516 of a second frame 528. Frames 568, 528 can comprise a distal end 556 and 516, respectively, and a proximal end 550 and 510, respectively. The serpentine robotic crawler can further comprise a propulsion system configured to cause the frames 568 and 528 to move about a ground or other surface, and relative to one another, such as to achieve different configurations and propulsion modes. The propulsion system can comprise a drive subsystem 554, which can be supported about and operable with frame 568, and a similar drive subsystem 514, which can be supported about and operable with frame 528. The drive subsystems may include various motors, drive trains, controls, etc. The propulsion system may further comprise one or more surface contacting elements that facilitate propulsion of the serpentine robotic crawler, such as a continuous or endless track 552 rotatably supported about frame 568 operable with drive subsystem 554, and continuous or endless track 512 rotatably supported about frame 528 and operable with drive subsystem 514. Addition of the rotatable endless tracks 552 and 556 to their respective frame units provides mobility to the serpentine robotic crawler 500 in a way that allows the serpentine robotic crawler 500 to move about the ground or other surfaces, and to overcome numerous obstacles. Other types of surface contacting elements may be employed, as will be recognized by those skilled in the art, such as wheels, rotating joints, etc., each of which are contemplated herein.

The robotic serpentine device 500 can further comprise a multiple degree of freedom linkage arm 540 coupling together the frames 568 and 528 at or near proximal ends 550 and 510 of each respective frame 568 and 528. In one exemplary embodiment, the multiple degree of freedom linkage arm 540 can be moveable relative to frames 568 and 528. Movement of the multiple degree of freedom linkage arm 540 can be passive, actuated, or braked. In the embodiment shown, the multiple degree of freedom linkage arm 540 can include pivoting articulating joints 580*a-e* and rotating articulating joints 590*a-b*. All or some of these articulating joints 580*a-e* and 590*a-b* can be actuatable to achieve selective positioning of the joints relative to one another and the frames 568, 528. Indeed, the articulating joints can facilitate the serpentine robotic crawler 500 assuming a variety of configurations and positioning of the first and second frames 568, 528 relative to one another, and also the first dexterous manipulator 562 relative to the second dexterous manipulator 524. The serpentine robotic crawler 500 can assume a tank-like configuration having the frames 568, 528 and the rotatable endless tracks 552 and 512 in a side-by-side arrangement with each other. In other situations, the serpentine robotic crawler 500 can assume alternative configurations, such as configuration with the frame units in a tandem relationship relative to one another. These different configurations are discussed in more detail below.

Frame units 568 and 528 may each be equipped with stops 570 and 530, respectively, or other limiter devices or systems, which may limit the degree of rotation of the multiple degree of freedom linkage arm 540, such that the joints coupled to frames 568 and 528 are prohibited from rotating to such a degree that the joints interfere with the operation of the endless tracks 550 and 510.

The dexterous manipulators 562 and 522 may each comprise respective jointed members 558 and 518 pivotally connected or coupled to or otherwise about the distal ends 556 and 516 of frames 568 and 528, respectively. The jointed members 558 and 518 can help facilitate the dexterous manipulators 562, 522 being capable of operating or functioning in a wrist-like manner, meaning to move in multiple degrees of freedom about multiple different axes similar to the human wrist.

One or both of the dexterous manipulators 562 and 522 can further comprise an end effector (e.g., see end effectors 560 and 520 operable with jointed members 558 and 518, respectively) configured to operate on or manipulate, or otherwise interface with a work piece (e.g., an object, another end effector, the ground or other surface, etc.). Essentially, the dexterous manipulators 562 and 522, with their end effectors 560 and 520, respectively, can be configured to manipulate or otherwise interface with an object or thing for the purpose of performing a dexterous operation.

The end effectors 562, 522 can comprise a variety of different configurations, depending upon the task to be performed. For example, the end effectors can be designed to comprise components operable to apply two opposing forces on a work piece giving it some functionality similar to a human hand. In one aspect, such as in the embodiment shown, the end effectors may comprise opposing finger components that move relative to one another, and that are configured to apply opposing forces in a direction towards one another, or to constrict, similar to a human finger against an opposable thumb. In another aspect, the end effectors may comprise components configured to be operated to apply counter or opposing forces in a direction away from one another, or to expand.

The unique positioning capabilities of the frames and articulating linkage of the serpentine robotic crawler, along with the jointed members 558 and 518 in conjunction with their respective end effectors 560 and 520, facilitates dynamic positioning of the serpentine robotic crawler, and more particularly its dexterous manipulators 562, 522, relative to one or more given work pieces, and/or relative to each other. Further, similar to the stops 570 and 530 between the multiple degree of freedom linkage arm 540, stops 566 and 526 may be affixed to respective frames 568 and 528 in order to ensure that the jointed members 558 and 518 do not interfere with respective rotating endless tracks 522 and 512.

To provide additional dexterity to, and to facilitate enhanced positioning and capabilities of, the dexterous manipulators 562 and 522, one or both of the dexterous manipulators 562 and 522 may further comprise a rotational joint, such as rotational joints 564 and 524, operable with the jointed members 516, 558 and the end effectors 560, 520, respectively, to allow the dexterous manipulators 562, 522 to function in a wrist-like manner having multiple degrees of freedom (e.g., to provide pitch, yaw and roll functionality to or as imparted to the end effector). Each of the rotational joints 564 and 524 can be rotatably coupled to the jointed members 516, 558 and configured to rotate (i.e., twist) back and forth within a full 360 degrees about the end of jointed members 558, 518, respectively about axis B. Additionally, rotational joints 564 and 524 may also be configured such that they may rotate continuously, i.e. they may be able to perform infinite continuous and successive complete revolutions in a first or clockwise direction as well as in an opposing, second or counterclockwise direction. Further, each end effector 560 and 520 may be pivotally coupled to the rotational joints 564 and 524, respectively, and configured to pivot in a bi-directional manner within a range (e.g., 0-360 degrees; 0-180 degrees, etc. as measured about axis B, and depending upon the design and configuration of the dexterous manipulator and the various joints therein). The various degrees of freedom provided by the jointed members, the rotational joints and the end effector, as operably coupled together, as well as the various degrees of freedom within the articulated linkage allow the dexterous manipulators 562, 522, and particularly the end effectors 560 and 520, to be positioned in virtually any orientation with respect to their respective frames 568, 528 and a workpiece, or with respect to each other.

The various components of the serpentine robotic crawler can be actively articulated or passively articulated. For example, in one exemplary embodiment, dexterous manipulators 562 and 522, as well as the various joints making up the multiple degree of freedom linkage arm 540, may be actively actuated using servo motors, driveshaft systems, chain drive systems, hydraulic systems, tendon/pulley type systems, or any other suitable actuation means as will be recognized by those skilled in the art. Alternatively, the dexterous manipulators 562, 522, as well as the various joints in the multiple degree of freedom linkage arm 540, may be operated using one or more types of passive systems, such as braking systems, locking systems, or any other suitable system capable of maintaining these in a locked position. These active or passive articulation systems can operate to facilitate positioning of the various movable joints of each respective dexterous manipulator 562 and 522, as well as the multiple degree of freedom arm 540 to place the dexterous manipulators 562, 522 in a desired or needed position.

It should be noted that for the particular embodiment shown in FIG. 5, the configurations and features described in relation to frame 568 and associated dexterous manipulator 562 can be similarly applicable to frame 528 and its associated dexterous manipulator 522. Nonetheless, frame 528 and dexterous manipulator 562 can be configured differently, such as to employ varying end effectors, wrists and jointed members, as those skilled in the art will appreciate, which different configurations are contemplated herein.

Figure 6:
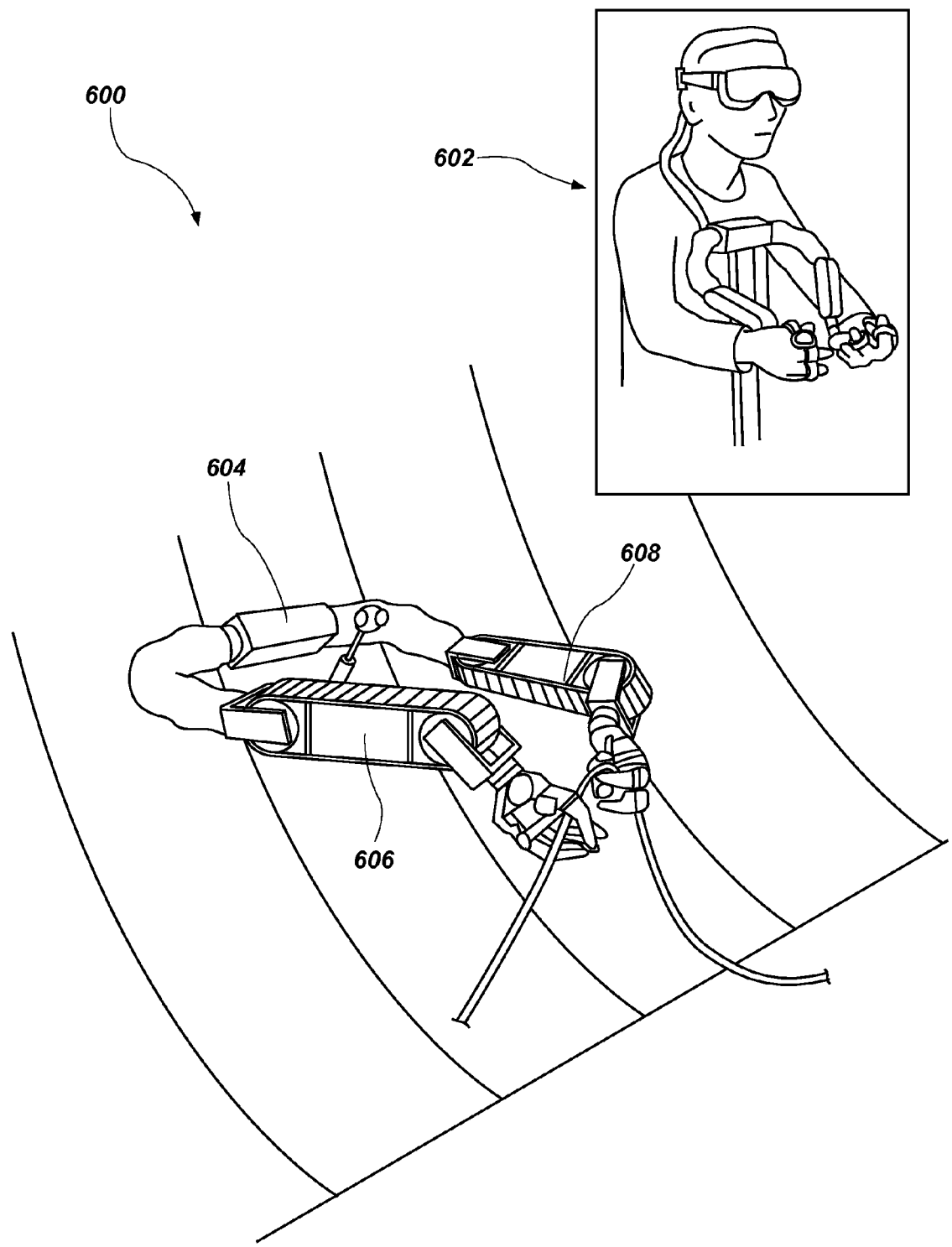
FIG. 6 illustrates an example of serpentine robotic crawler being controlled by an operator.

FIG. 6 illustrates an example of serpentine robotic crawler 600 being controlled by an operator 602. The serpentine robotic crawler 600 comprising frame units and dexterous manipulators 606, 608 held to an object (e.g. to a ferromagnetic material wall) by a clamping device 604 (e.g. suction cups, gripper, or magnetic clamp, such as an electromagnet or permanent magnets with variable flux return path to control the clamping force). As described herein, the serpentine robotic crawler 10 can perform single or two-handed dexterous operations.

Figure 7:
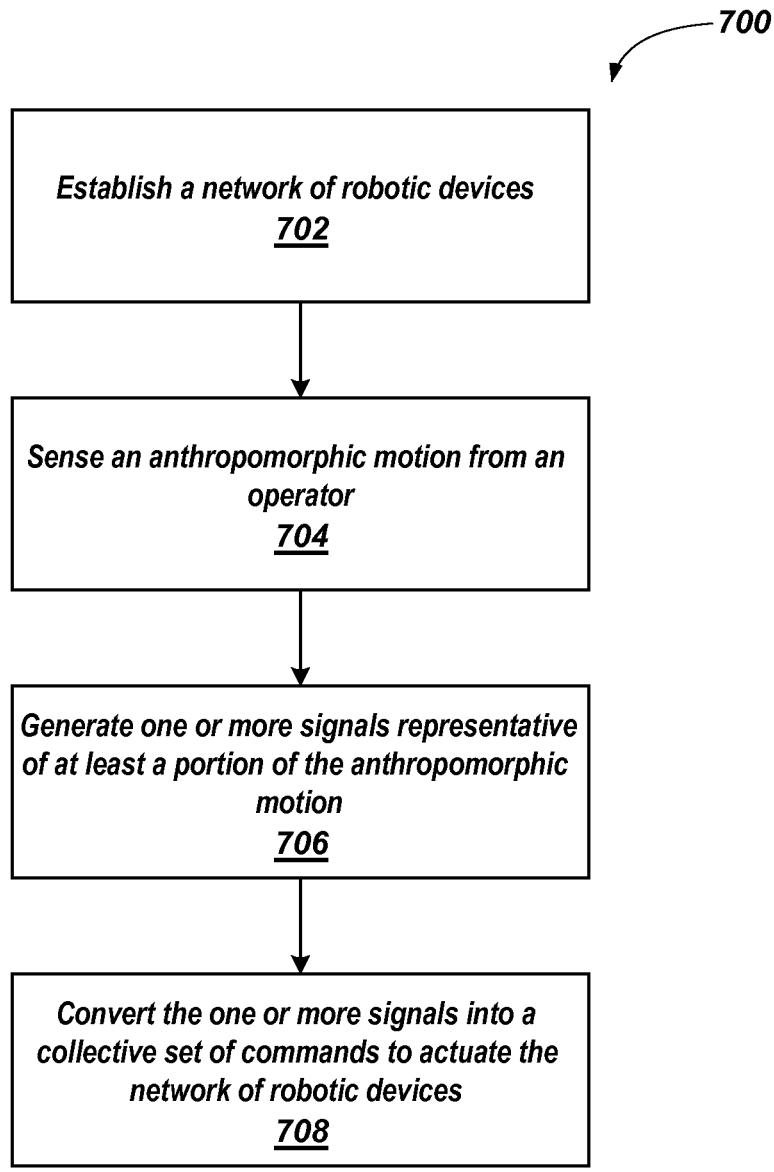
FIG. 7 is a flowchart illustrating an example coordinated robotic control method for a network of robotic devices.

FIG. 7 is a flowchart illustrating an example coordinated robotic control method 700. In method element 702, a network of robotic devices is established. In method element 704, an anthropomorphic motion may be sensed from an operator. In method element 706, one or more signals representative of at least a portion of the anthropomorphic motion may be generated, and the one or more signals may be converted into a collective set of commands to actuate the network of robotic devices, as shown in method element 708. The collective set of commands is functionally equivalent to the anthropomorphic motion. The method 700 may be embodied on a non-transitory computer-readable medium.

Figure 8:
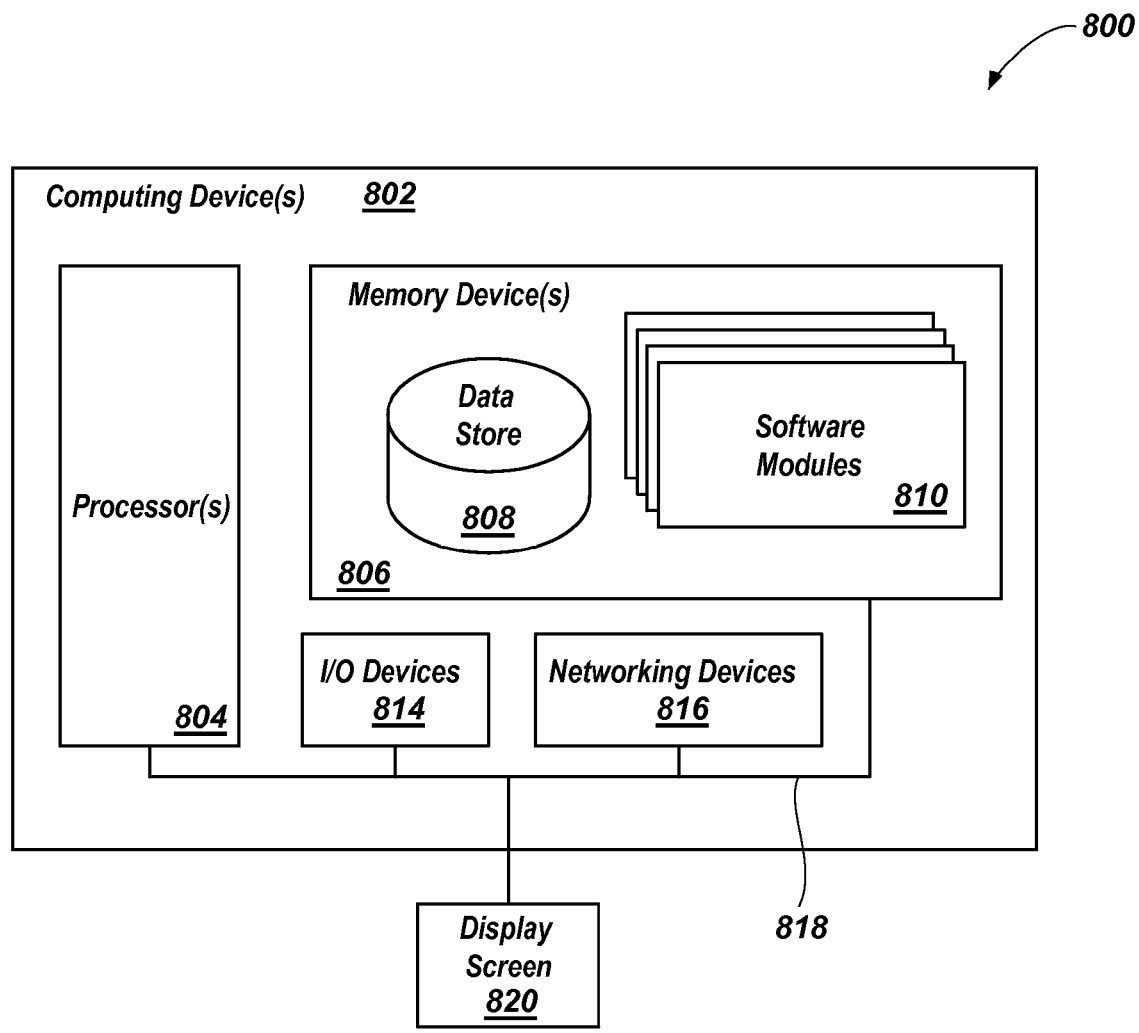
FIG. 8 is block diagram illustrating an example of a computing device that may be used in coordinated robotic control.

FIG. 8 is block diagram 800 illustrating an example of a computing device 802 that may be used for discovering content. In particular, the computing device 802 is illustrates a high level example of a device on which modules of the disclosed technology may be executed. The computing device 802 may include one or more processors 804 that are in communication with memory devices 806. The computing device 802 may include a local communication interface 818 for the components in the computing device. For example, the local communication interface may be a local data bus and/or any related address or control busses as may be desired.

The memory device 806 may contain modules that are executable by the processor(s) 804 and data for the modules. Located in the memory device 806 are various modules 810 implementing functionality heretofore described. The various modules 810 are executable by the processor(s) 804. A data store 808 may also be located in the memory device 806 for storing data related to the modules and other applications along with an operating system that is executable by the processor(s) 804.

Other applications may also be stored in the memory device 806 and may be executable by the processor(s) 804. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen 820 that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 806 may be executed by the processor(s) 804. The term "executable" may mean a program file that is in a form that may be executed by a processor 804. For example, a program in a higher level language may be compiled into machine code in a format that may be loaded into a random access portion of the memory device 806 and executed by the processor 804, or source code may be loaded by another executable program and interpreted to generate instructions in a random access portion of the memory to be executed by a processor. The executable program may be stored in any portion or component of the memory device 806. For example, the memory device 806 may be random access memory (RAM), read only memory (ROM), flash memory, a solid state drive, memory card, a hard drive, optical disk, floppy disk, magnetic tape, or any other memory components.

The processor 804 may represent multiple processors and the memory 806 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A coordinated robotic control method comprising:
    under the control of one or more computer systems configured with executable instructions:
        establishing a network of individual autonomous robotic devices;
        sensing an anthropomorphic motion from an operator;
        generating one or more signals representative of at least a portion of the anthropomorphic motion; and
        converting the one or more signals into a collective set of commands to actuate a plurality of robotic devices within the network of robotic devices, wherein the collective set of commands is functionally equivalent to the anthropomorphic motion.

2. The method of claim 1, further comprising communicating the collective set of commands to the network of robotic devices.

3. The method of claim 2, wherein communicating the collective set of commands comprises communicating to each robotic device in the network of robotic devices a respective subset of commands from the collective set of commands.

4. The method of claim 1, wherein the network of robotic devices comprises a master robotic device and one or more slave robotic devices, and wherein the master robotic device receives the collective set of commands and distributes the collective set of commands to the network of robotic devices.

5. The method of claim 1, further comprising:
    sensing feedback from the network of robotic devices; and
    presenting sensed feedback to an operator.

6. The method of claim 5, wherein presenting sensed feedback to the operator includes at least one of actuating an operator device, generating audio, or engaging vibratory pads.

7. The method of claim 5, wherein presenting sensed feedback to the operator includes visually displaying sensed feedback.

8. The method of claim 1 embodied on a non-transitory computer-readable medium.

9. A coordinated robotic system comprising:
    a plurality of control sensors to sense an anthropomorphic motion;
    a plurality of robotic devices to receive a command and actuate a motion based on the command; and
    a coordinated robotic control device, communicatively connected to the plurality of control sensors and the plurality of individual autonomous robotic devices, to convert the anthropomorphic motion, sensed by the plurality of control sensors, into a collective set of commands to actuate the plurality of robotic devices, wherein the collective set of commands is functionally equivalent to the anthropomorphic motion.

10. The system of claim 9, wherein the plurality of control sensors attach to an operator.

11. The system of claim 9, wherein the plurality of robotic devices includes a serpentine robotic crawler.

12. The system of claim 9, wherein the coordinated robotic control device converts the anthropomorphic motion to the collective set of commands with one or more computer systems configured with executable instructions.

13. A coordinated robotic control device comprising:
    a processor;
    a memory device including instructions to be executed by the processor to perform a set of actions;
    a plurality of control sensors configured to sense anthropomorphic motion;
    a feedback device configured to receive robotic feedback;
    a kinematic convertor configured to convert an anthropomorphic motion, sensed by the plurality of control sensors, into a collective set of commands to actuate degrees of motion by a plurality of individual autonomous robotic devices within a network of robotic devices, wherein the collective set of commands is functionally equivalent to the anthropomorphic motion; and
    a communication interface configured to communicate with the network of robotic devices.

14. The device of claim 13, wherein the feedback device comprises at least one of a video display, an audio speaker, or a tactile feedback device.

15. The device of claim 13, wherein feedback received from the feedback device is presented to an operator through a device integrated with at least one of the plurality of control sensors.

16. The device of claim 13, wherein the plurality of control sensors sense three-dimensional motion.

17. The device of claim 13, wherein an environment is programmatically defined for the kinematic convertor which limits functional equivalency.

18. The device of claim 17, wherein the environment is programmatically defined with an extensible markup language (XML) document.

* * * * *